(12) United States Patent
Morino (10) Patent No.: US 10,409,097 B2
(45) Date of Patent: Sep. 10, 2019

(54) DISPLAY DEVICE

(71) Applicant: SHARP KABUSHIKI KAISHA, Sakai, Osaka (JP)

(72) Inventor: Shinya Morino, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/212,528

(22) Filed: Dec. 6, 2018

(65) Prior Publication Data

US 2019/0179194 A1 Jun. 13, 2019

(30) Foreign Application Priority Data

Dec. 12, 2017 (JP) ................. 2017-237563

(51) Int. Cl.
*G02F 1/1333* (2006.01)

(52) U.S. Cl.
CPC .............. *G02F 1/133308* (2013.01); *G02F 2001/133314* (2013.01); *G02F 2001/133331* (2013.01); *G02F 2201/46* (2013.01); *G02F 2202/28* (2013.01)

(58) Field of Classification Search
CPC ............ G02F 1/133308; G02F 2001/133331
See application file for complete search history.

(56) References Cited

U.S. PATENT DOCUMENTS

2012/0075838 A1* 3/2012 Lee ................... G02F 1/133308
362/97.1
2013/0120227 A1 5/2013 Tanikawa

FOREIGN PATENT DOCUMENTS

JP 2013-105144 A 5/2013

* cited by examiner

*Primary Examiner* — Thanh Nhan P Nguyen
(74) *Attorney, Agent, or Firm* — ScienBiziP, P.C.

(57) ABSTRACT

A display device includes a display module including a display surface, a light transmissive panel, a first fixing layer, a case, a second fixing layer, a first area, a second area, and a third area. The light transmissive panel includes a fixing plate surface opposed to the display surface. The first fixing layer is disposed between the fixing plate surface and the display surface. The case includes a fixing-plate-surface opposed surface opposed to the fixing plate surface. The second fixing layer is disposed between the fixing plate surface and the fixing-plate-surface opposed surface. The fixing plate surface includes the first area, the second area, and the third area located between the first area and the second area. The first area overlaps the first fixing layer. The second area overlaps the second fixing layer. The third area has wettability less than wettability of the first area and the second area.

8 Claims, 7 Drawing Sheets

DISPLAY DEVICE

CROSS REFERENCE TO RELATED APPLICATION

This application claims priority from Japanese Patent Application No. 2017-237563 filed on Dec. 12, 2017. The entire contents of the priority application are incorporated herein by reference.

TECHNICAL FIELD

The technology described herein relates to a display device.

BACKGROUND

A known display device includes a driver circuit board, a display layer, a surface film, and a moisture barrier film. The driver circuit board includes an adhesive area around a display area. The display layer is formed in the display area. The surface film is opposed to a display surface of the display layer. The moisture barrier film is disposed between the display layer and the surface film. The moisture barrier film contacts the driver circuit board in the adhesive area. The display layer is sealed between the driver circuit board and the moisture barrier film. An example of such a display is disclosed in Japanese Unexamined Patent Application Publication No. 2013-105144.

In the display device, the moisture barrier film is fixed to a common substrate with a transparent adhesive in the display area and to the driver circuit board that covers a lower surface of the display layer with an adhesive in the adhesive area. If the common substrate and the driver circuit board are fixed to the moisture barrier film at different timing, ingredients in the transparent adhesive for fixing the common substrate or the adhesive for fixing the driver circuit board whichever fixed first may spread over an area of the moisture barrier film on a common substrate side or a driver circuit board side. If so, wettability of the transparent adhesive for fixing the common substrate or the adhesive for fixing the driver circuit board whichever fixed later to the moisture barrier film may be degraded and thus common substrate or the driver circuit board may not be properly fixed to the moisture barrier film. This may result in improper fixation or a decrease in airtightness.

SUMMARY

The technology described herein was made in view of the above circumstances. An object is to improve reliability in fixation.

A display device includes a display module, a light transmissive panel, a first fixing layer, a case, a second fixing layer, a first area, a second area, and a third area. The display module includes a display surface for displaying images. The light transmissive panel includes a fixing plate surface opposed to the display surface and is configured to pass light therethrough. The first fixing layer is disposed between the fixing plate surface and the display surface. The case includes a fixing-plate-surface opposed surface opposed to the fixing plate surface and holds the display module. The second fixing layer is disposed between the fixing plate surface and the fixing-plate-surface opposed surface. The first area is included in the fixing plate surface and overlaps the first fixing layer. The second area is included in the fixing plate surface and overlaps the second fixing layer. The third area is included in the fixing plate surface, located between the first area and the second area, and has wettability less than wettability of the first area and the second area.

The images displayed on the display surface of the display module are viewed by a user through the transmissive panel that passes the light therethrough. The display module is fixed to the light transmissive panel with the first fixing layer disposed between the fixing plate surface and the display surface. The case is fixed to the light transmissive panel with the second fixing layer disposed between the fixing plate surface and the fixing-plate-surface opposed surface. The display module is held in the case. The first area of the fixing plate surface overlapping the first fixing layer and the second area of the fixing plate surface overlapping the second fixing layer have the wettability greater than the wettability of the third area. Therefore, proper fixing performance of the first fixing layer and the second fixing layer relative to the fixing plate surface of the light transmissive panel can be achieved. In the fixing plate surface of the light transmissive panel, the third area having the wettability less than the wettability of the first area and the second area is provided between the first area and the second area. Ingredients in the first fixing layer that overlaps the first area are less likely to spread over the second area beyond the third area or ingredients in the second fixing layer that overlaps the second area are less likely to spread over the first area beyond the third area. Therefore, the wettability of the first area and the second area is less likely to be degraded. If the display module and the case are fixed to the light transmissive panel at different timing, the ingredients in the first fixing layer or the second fixing layer for fixing the display module or the case whichever fixed first are less likely to spread beyond the third area. Therefore, the wettability of the first fixing layer or the second fixing layer for fixing the display module or the case whichever fixed later relative to the fixing plate surface is properly maintained. Improper attachment or a decrease in airtightness of the display module or the case is less likely to occur.

To remove the display module or the case from the light transmissive panel, the fixing performance of the first fixing layer or the second fixing layer is reduced using a remover. If the case needs to be removed first, the remover is applied to the second fixing layer. The remover is less likely to spread over the first area beyond the third area that has the less wettability and remains in the second area. Therefore, the fixing performance of the second fixing layer is degraded in a short period. According to the configuration, efficiency in removal of the display module or the case improves.

According to the technology described herein, the reliability in fixation improves.

DETAILED DESCRIPTION

First Embodiment

A first embodiment will be described with reference to FIGS. 1 to 7. In this section, a liquid crystal display device 10 (a display device) will be described. The X axes, the Y axes, and the Z axes may be present in the drawings. The axes in each drawing correspond to the respective axes in other drawings to indicate the respective directions. An upper side and a lower side in FIGS. 2 to 4 correspond to a front side and a back side of the liquid crystal display device 10, respectively.

Figure 1:
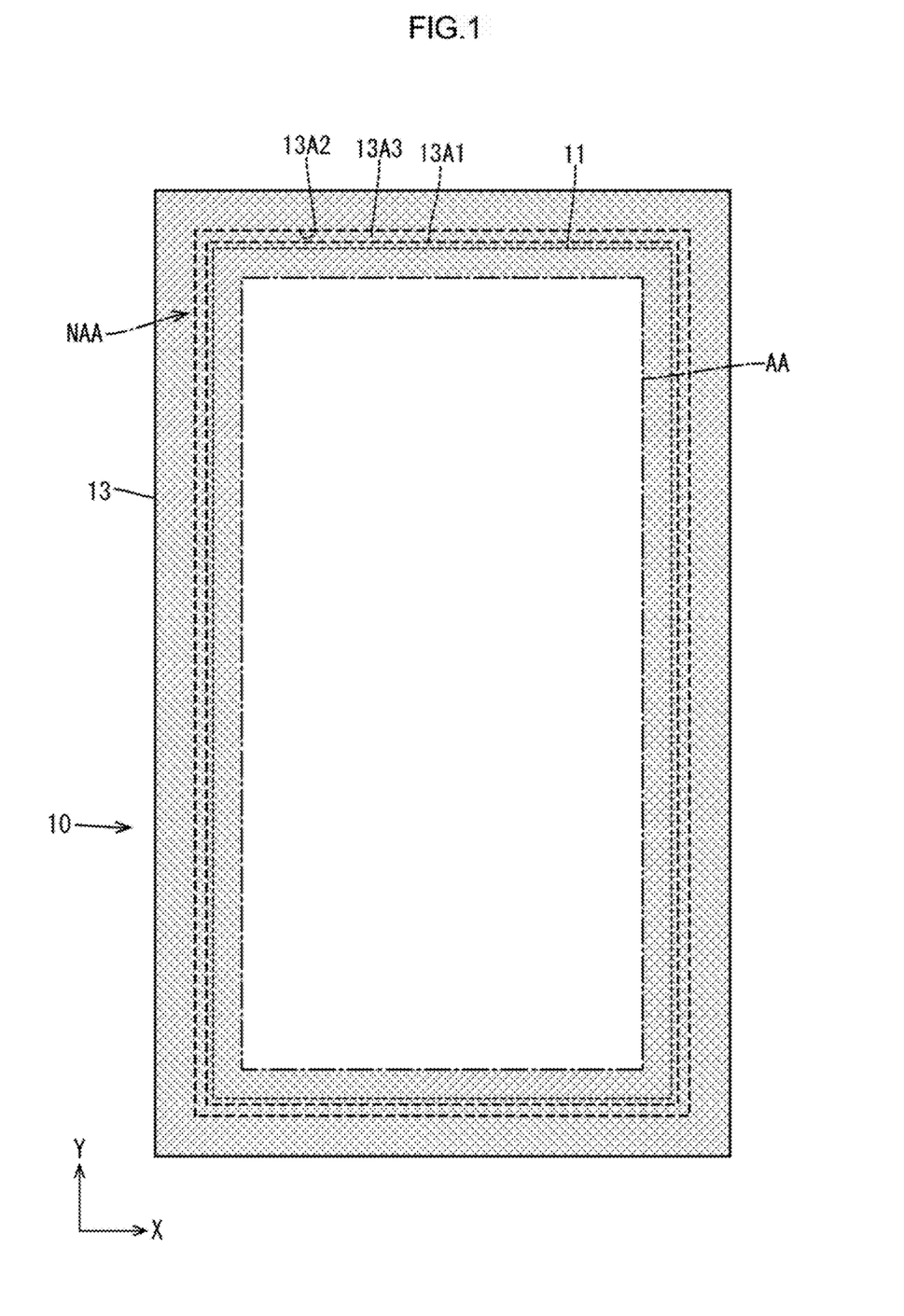
FIG. 1 is a plan view of a liquid crystal display device according to a first embodiment.

As illustrated in FIG. 1, the liquid crystal display device 10 has a vertically-long rectangular shape in a plan view. The liquid crystal display device 10 includes a liquid crystal display module 11 that is classified as a small-sized display module with a screen size of some inches. Application of the liquid crystal display device 10 includes portable information terminal such as smartphones.

Figure 2:
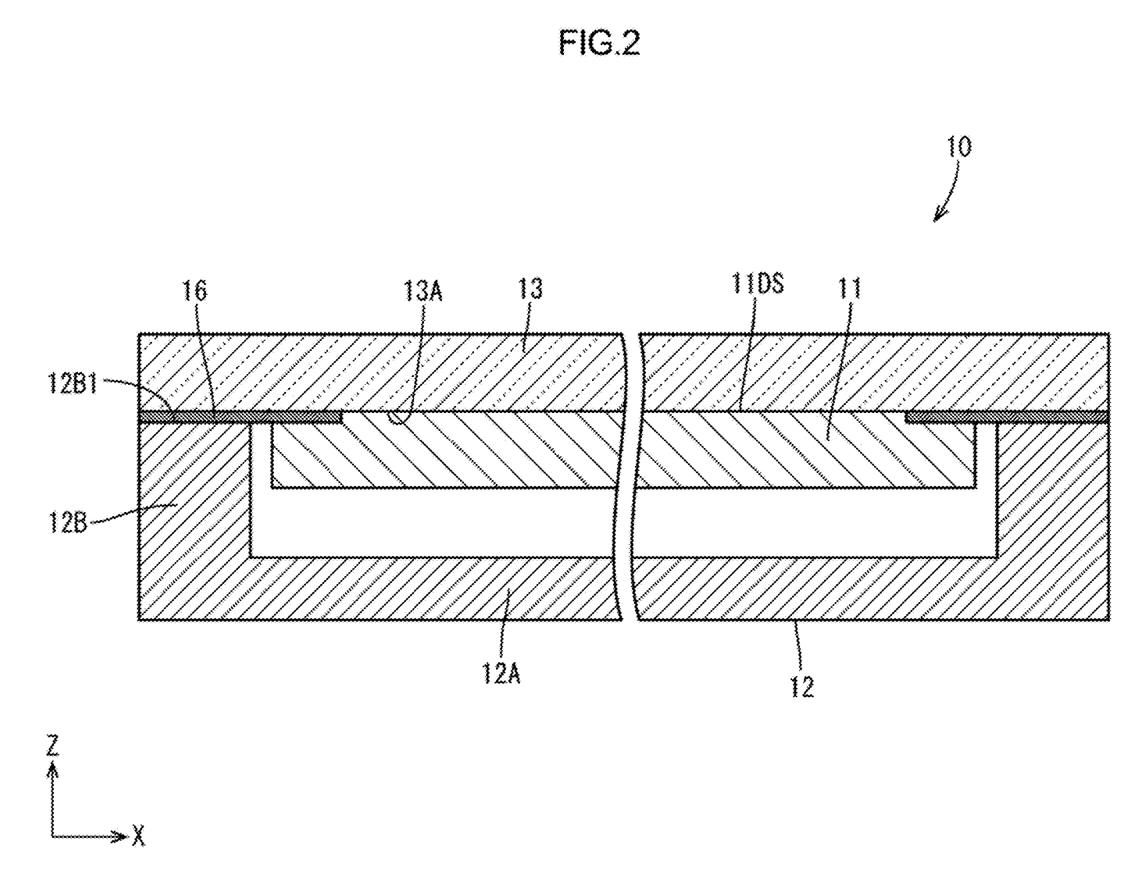
FIG. 2 is a cross-sectional view of the liquid crystal display device.

As illustrated in FIGS. 1 and 2, the liquid crystal display device 10 includes the liquid crystal display module 11 (a display module), a case 12, and a cover glass 13 (a light transmissive panel, a protective panel). The liquid crystal display module 11 includes a display surface 11DS for displaying images. The case 12 holds the liquid crystal display module 11 therein. The cover glass 13 is disposed in front of the liquid crystal display module 11 and the case 12 that are attached to the cover glass 13.

As illustrated in FIG. 2, the liquid crystal display module 11 includes a liquid crystal panel (a display panel) and a backlight unit. The liquid crystal panel includes the display surface 11DS. The backlight unit is disposed behind the liquid crystal panel (on an opposite side from the cover glass 13) and configured to apply light to the liquid crystal panel for image display. The display surface 11DS of the liquid crystal display module 11 is opposed to a fixing plate surface 13A that is a section of the back surface of the cover glass 13. The display surface 11DS is fixed to the cover glass 13 with a first fixing layer 14 disposed between the fixing plate surface 13A and the display surface 11DS. The first fixing layer 14 includes an adhesive that is substantially transparent and having high light transmissivity such as optical clear resin (OCR). As illustrated in FIG. 1, the liquid crystal display module 11 has an area (a long dimension and a short dimension) smaller than an area (a long dimension and a short dimension) of the cover glass 13. The display surface 11DS of the liquid crystal display module 11 includes a display area (an active area) AA and a non-display area (a non-active area) NAA that has a frame shape to surround the display area AA. Images are displayed in the display area AA and not displayed in the non-display area NAA. In FIG. 1, a chain line indicates a boundary of the display area AA and an area outside the chain line is the non-display area NAA.

As illustrated in FIG. 2, the case 12 has a box shape with an opening on the front side. The case 12 holds the liquid crystal display module 11 therein. The case 12 includes a bottom portion 12A and a frame portion 12B (side sections). The bottom portion 12A is slightly larger than the liquid crystal display module 11 in a plan view. The frame portion 12B projects frontward from edges of the bottom portion 12A in the Z-axis direction (a normal direction to the display surface 11DS). The bottom portion 12A has a flat plate shape. Components including substrates are disposed in a space between the bottom portion 12A and the liquid crystal display module 11. The frame portion 12B surrounds the liquid crystal display module 11 for an entire periphery of the liquid crystal display module 11. A distal end surface of the frame portion 12B at a distal end of the frame portion 12B farther from the bottom portion 12A is defined as a fixing-plate-surface opposed surface 12B1 opposed to the fixing plate surface 13A of the cover glass 13. The fixing-plate-surface opposed surface 12B1 of the frame portion 12B of the case 12 is fixed to the cover glass 13 with a second fixing layer 15 disposed between the fixing-plate-surface opposed surface 12B1 and the fixing plate surface 13A of the cover glass 13. The second fixing layer 15 includes an adhesive that contains a black light blocking material having high light absorbing and high light blocking properties (e.g., carbon black).

As illustrated in FIGS. 1 and 2, the cover glass 13 is disposed to cover the entire front surfaces of the liquid crystal display module 11 and the case 12 to protect the liquid crystal display module 11 and the case 12. The cover glass 13 is a part of a front exterior of the liquid crystal display device 10. A back plate surface of the cover glass 13 includes the fixing plate surface 13A to which the liquid crystal display module 11 and the case 12 are fixed with the first fixing layer 14 and the second fixing layer 15. The cover glass 13 includes a light blocking portion 16 that is a portion of the fixing plate surface 13A. The light blocking portion 16 is made of black light blocking material having high light absorbing and high light blocking properties (e.g., carbon black). The light blocking portion 16 is formed by printing or applying the light blocking material on the back surface of the cover glass 13. The light blocking section 16 is disposed over the non-display area NAA of the liquid crystal display module 11 and the frame portion 12B of the case 12 but not to overlap the display area AA of the liquid crystal display module 11. In FIG. 1, the light blocking portion 16 is indicated by shading. The cover glass 13 includes a base made of substantially transparent glass having high light transmissivity and formed in a plate shape. Preferably, the cover glass 13 is made of toughened glass. Chemically toughened glass may be preferable for the toughened glass that may be used for the cover glass 13. The chemically toughened glass includes a glass substrate and a chemically toughened layer formed on surfaces of the glass substrate through chemically toughening treatment. The cover glass 13 has high physical strength and high resistance to impact. Therefore, the liquid crystal display module 11 and the case 12 that are disposed behind the cover glass 13 are less likely to be broken or scratched.

Figure 3:
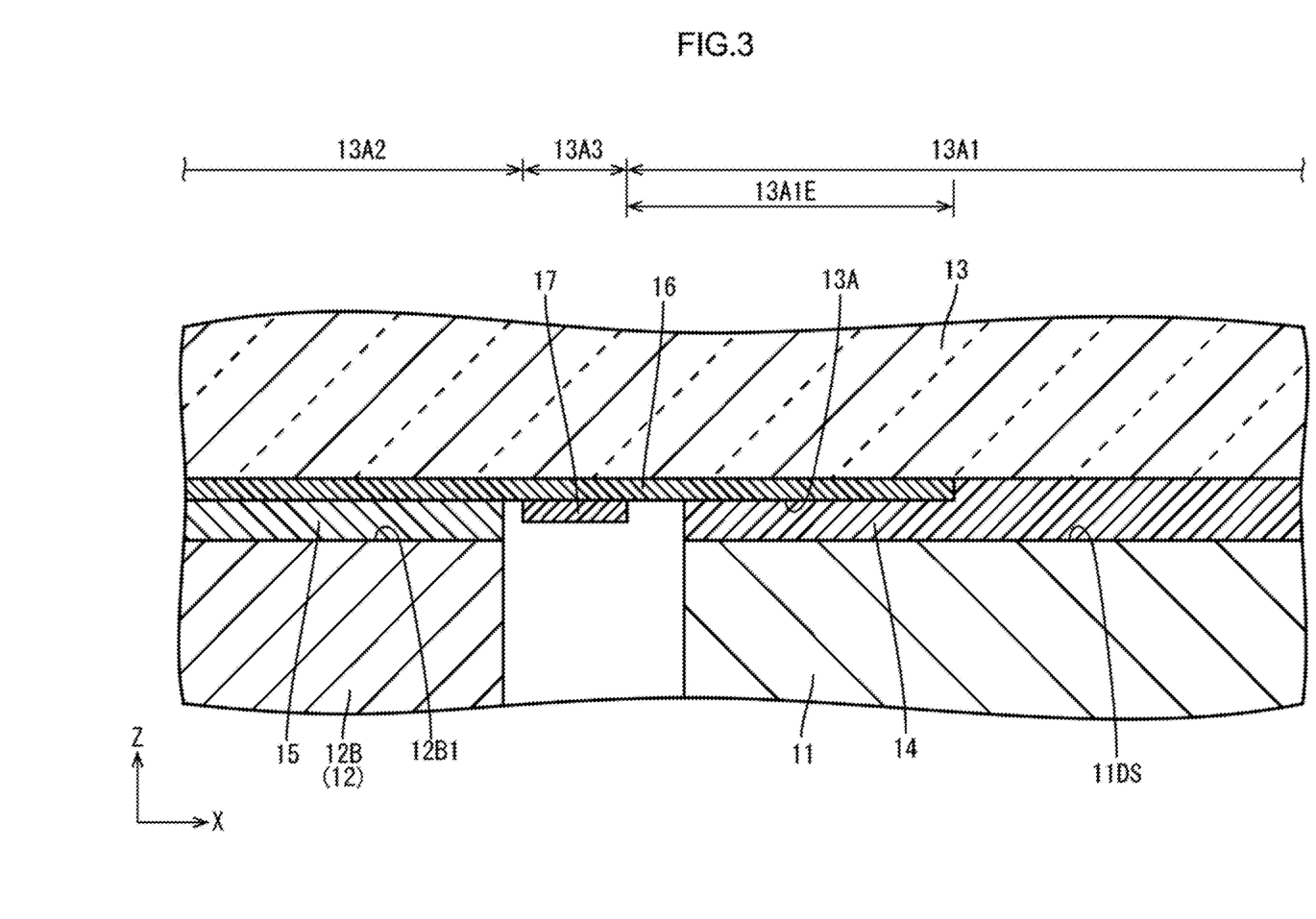
FIG. 3 is a cross-sectional view of the liquid crystal display device illustrating a first area to a third area of a fixing plate surface of a cover glass.

As illustrated in FIG. 3, the fixing plate surface 13A of the cover glass 13 includes a first area 13A1, a second area 13A2, and a third area 13A3. The first area 13A1 overlaps at least the first fixing layer 14. The second area 13A2 overlaps at least the second fixing layer 15. The third area 13A3 is located between the first area 13A1 and the second area 13A2. The first area 13A1 is located in the middle of the fixing plate surface 13A of the cover glass 13. The first area 13A1 has a vertically-long rectangular shape in a plan view. The first area 13A1 covers at least the entire areas of the liquid crystal display module 11 and the first fixing layer 14 in the plan view. The second area 13A2 is located at an outer portion of the fixing plate surface 13A. The second area 13A2 has a vertically-long rectangular frame shape in the plan view. The second area 13A2 covers at least the entire areas of the frame portion 12B of the case 12 and the second fixing layer 15 in the plan view. The first area 13A1 includes an outer section 13A1E has a frame shape along the second area 13A2. The outer section 13A1E of the first area 13A1 and the second area 13A2 are included in the light blocking portion 16. More specifically, the outer section 13A1E of the first area 13A1 and the second area 13A2 of the fixing plate surface 13A are areas of the surface of the light blocking portion 16.

Figure 4:
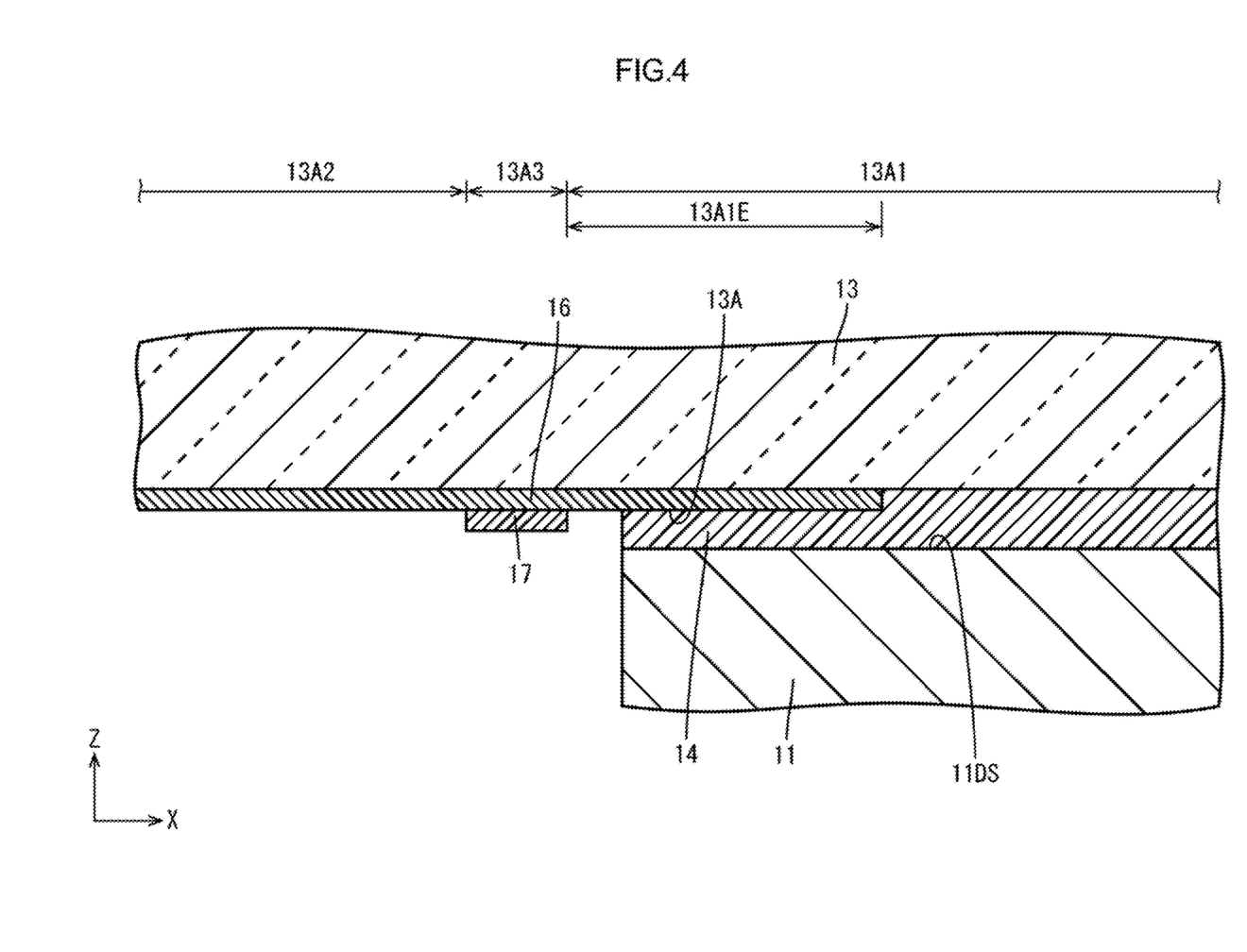
FIG. 4 is a cross-sectional view of the liquid crystal display device after a liquid crystal display module is fixed to the cover glass and before a case is fixed.

As illustrated in FIG. 3, the third area 13A3 has a vertically-long rectangular frame shape along the second area 13A2 in the plan view. The third area 13A3 surrounds the entire perimeter of the first area 13A1. The third area 13A3 has wettability less than the wettability of the first area 13A1 and the second area 13A2. Namely, the first area 13A1 and the second area 13A2 have the wettability greater than the wettability of the third area 13A3. Therefore, the first fixing layer 14 and the second fixing layer 15 are properly fixed to the fixing plate surface 13A of the cover glass 13. The third area 13A3 between the first area 13A1 and the second area 13A2 has the wettability less than the wettability of the first area 13A1 and the second area 13A2. Therefore, ingredients of a plasticizer such as alcohol and acid included in the first fixing layer 14 overlapping the first area 13A1 are less likely to spread over the second area 13A2 beyond the third area 13A3 or ingredients of a plasticizer included in the second fixing layer 15 overlapping the second area 13A2 are less likely to spread over the first area 13A1 beyond the third area 13A3. According to the configuration, the wettability of the first area 13A1 is less likely to be degraded due to the ingredients in the second fixing layer 15 of the wettability of the second area 13A2 is less likely to be degraded due to the ingredients in the first fixing layer 14. As illustrated in FIG. 4, when the case 12 is attached after the liquid crystal display module 11 is attached to the cover glass 13, the ingredients in the first fixing layer 14 applied to the first area 13A1 to fix the liquid crystal display module 11 attached to the cover glass 13 before the case 12 are less likely to spread over the second area 13A2 from the first area 13A1 beyond the third area 13A3 on the fixing plate surface 13A. The wettability of the second area 13A2 is maintained at a high level without the ingredients in the first fixing layer 14 spreading over the second area 13A2. Therefore, the second fixing layer 15 applied to the second area 13A2 to fix the case 12 to the cover glass 13 after the liquid crystal display module 11 is fixed to the second area 13A2 with high adhesiveness. Improper attachment or a decrease in airtightness relative to the case 12 is less likely to occur. After the case 12 is attached, the ingredients in the second fixing layer 15 are less likely to spread over the first area 13A1 from the second area 13A2 beyond the third area 13A3. The light blocking material that is one of the ingredients in the second fixing layer 15 is less likely to spread over the first area 13A1. Therefore, improper colors are less likely to be observed in images displayed in the display area AA overlapping the first area 13A1. Because the fixing performance of the first fixing layer 14 is less likely to be degraded by the ingredients in the second fixing layer 15, the first fixing layer 14 is less likely to be removed.

As illustrated in FIG. 3, the cover glass 13 includes a light blocking layer 17 formed on a surface of the light blocking portion 16 on the liquid crystal display module 11 side. The light blocking layer 17 is located between the first fixing layer 14 and the second fixing layer 15 and includes a surface that defines the third area 13A3. The light blocking layer 17 is made of material different from the material of the light blocking portion 16. The wettability of the surface of the light blocking layer 17 is less than the wettability of the surface of the light blocking portion 16. By properly setting the material of the light blocking layer 17, the wettability of the third area 13A3 can be easily and properly reduced below the wettability of the first area 13A1 and the second area 13A2. As illustrated in FIG. 1, the light blocking layer 17 and the third area 13A3 have the frame shapes to surround the first area 13A1. Therefore, the ingredients in the first fixing layer 14 applied to the first area 13A1 are further less likely to spread over the second area 13A2 beyond the third area 13A3 or the ingredients in the second fixing layer 15 applied to the second area 13A2 are further less likely to spread over the first area 13A1 beyond the third area 13A3. Preferable widths of the light blocking layer 17 and the third area 13A3 are about 5 μm; however, the widths may be set at any values where appropriate.

The fixing plate surface 13A of the cover glass 13 has a surface tension is less than surface tensions of the first area 13A1 and the second area 13A2. The surface tensions of the first area 13A1 and the second area 13A2 may be equal to or greater than 36 mN/m. The surface tension of the third area 13A3 is equal to or less than 34 mN/m. In general, the greater the surface tension of a surface of an object is, the greater the wettability of the object. The less the surface tension of the object is, the less the wettability of the object is. Because the surface tension of the third area 13A3 is less than the surface tensions of the first area 13A1 and the second area 13A2, the wettability of the third area 13A3 is less than the wettability of the first area 13A1 and the second area 13A2.

Figure 5:
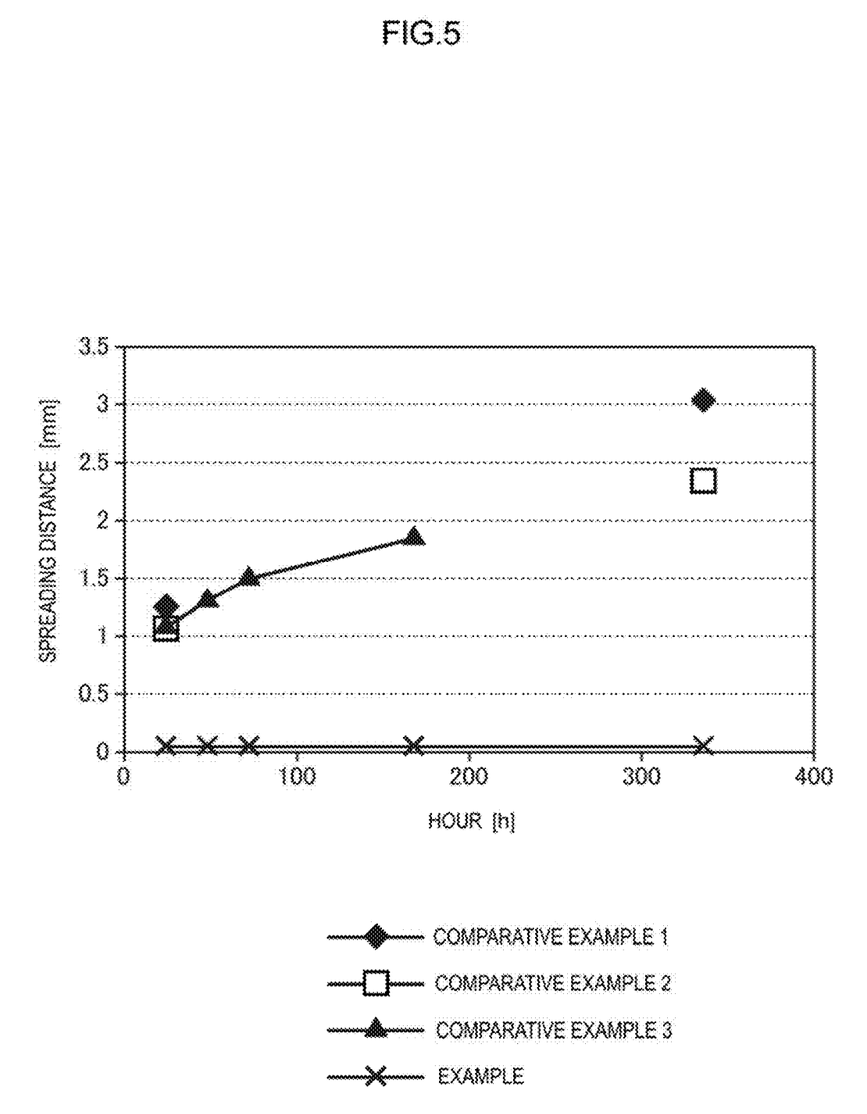
FIG. 5 is a graph illustrating results of an experiment.

To observe how spreading distances of ingredients in plasticizers vary by setting the surface tension of the third area 13A3 of the fixing plate surface 13A of the cover glass 13 less than the surface tensions of the first area 13A1 and the second area 13A2, an experiment was conducted. In the experiment, an example having and comparative examples 1 to 3 were used. The example includes the cover glass 13 that includes the fixing plate surface 13A, the surface tension of which is uneven. The example includes the third area 13A3. Each of comparative examples 1 to 3 includes a cover glass that includes a fixing plate surface, a surface tension of which is even. The fixing plate surface includes the first area 13A1 and the second area 13A2 but not the third area 13A3. The OCR, which is the material of the first fixing layer 14, is applied to the first area 13A1 of each of comparative examples 1 to 3. Travel distances of ingredients of the plasticizer in the first fixing layer 14 applied to the first area 13A1 of each example from a point of application (an initial point) were measured when predefined periods of time had passed. The results of the experiment are present in FIG. 5. In FIG. 5, a vertical axis and a horizontal axis represent a spreading distance (in millimeters (mm)) and a time (in hours (h)), respectively. For comparative examples 1 and 2, the spreading distances were measured at 24 hours and 336 hours after the application of the first fixing layer 14. For comparative example 3, the spreading distances were measured at 24 hours, 48 hours, 72 hours, and 168 hours after the application of the first fixing layer 14. For the example, the spreading distances were measured at 24 hours, 48 hours, 72 hours, 168 hours, and 336 hours after the application of the first fixing layer 14. Images of the example and comparative example 1 were captured at 336 hours after the application of the first fixing layer 14. The captured image of comparative example 1 is present in FIG. 6. The captured image of the example is present in FIG. 7.

Figure 6:
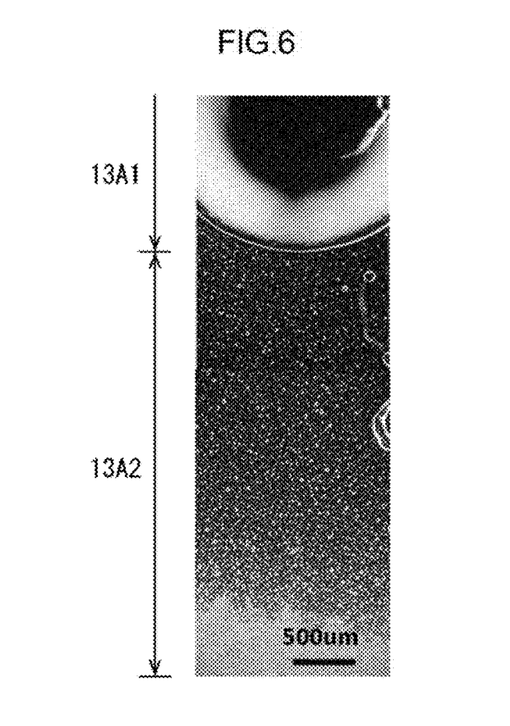
FIG. 6 is a captured image of comparative example 1 in the experiment.

The results of the experiment will be described. According to FIG. 5, the spreading distances of comparative examples 1 to 3 increase as time passes. The spreading distance of comparative example 1 at 24 hours after the application is about 1.25 mm and the spreading distance thereof at 336 hours after the application is about 3.03 mm. The spreading distance of comparative example 2 at 24 hours after the application is about 1.08 mm and the spreading distance thereof at 336 hours after the application is about 2.34 mm. The spreading distance of comparative example 3 at 24 hours after the application is about 1.08 mm and the spreading distance thereof at 168 hours after the application is about 1.85 mm. The spreading distances of comparative examples 1 to 3 are within a range from 2 mm to 3 mm. The range is about equal to a frame width of a smartphone that is one of the applications of the liquid crystal display device 10. In comparative example 1 to 3, the ingredients of the first fixing layers 14 applied to the first areas 13A1 reach the boundaries of the second areas 13A2. When the second fixing layers 15 are applied to the second areas 13A2, the wettability of the second areas 13A2 may be reduced for the entire areas and thus the fixing performance of the second fixing layers 15 relative to the cover glasses 13 may be degraded. Furthermore, the spreading distances at the same elapsed time are not equal to each other. According to FIG. 6, a condition of the most part of the second area 13A2 in comparative example 1 is about similar to a condition of the first area 13A1. The ingredients of the plasticizer in the first fixing layer 14 widely spread in the second area 13A2. A large portion of the first area 13A1 enclosed by a curve in FIG. 6 is a drop from the first fixing layer 14.

Figure 7:
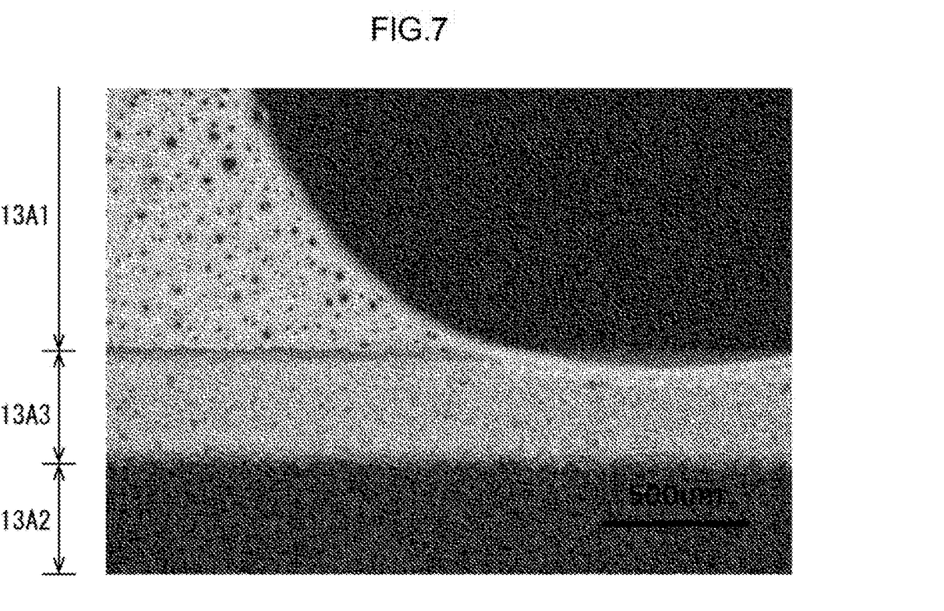
FIG. 7 is a captured image of an example in the experiment.

The spreading distances of the example are significantly less than the spreading distances of comparative examples 1 to 3. Furthermore, the spreading distances of the example are about equal to each other regardless of the elapsed time. Specifically, the spreading distances of the example are about 0.05 mm, that is, substantially constant between 24 hours and 336 hours after the application. The ingredients of the plasticizer in the first fixing layer 14 applied to the first area 13A1 are less likely to spread over the second area 13A2 beyond the third area 13A3. Therefore, the wettability of the second area 13A2 is less likely to decrease over time. During the application of the second fixing layer 15 to the second area 13A2, the second fixing layer 15 is fixed to the second area 13A2 with high adhesiveness. Therefore, improper attachment or the decrease in airtightness of the case 12 is less likely to occur. According to FIG. 7, conditions of the first area 13A1, the second area 13A2, and the third area 13A3 are different from one another. The ingredients of the plasticizer in the first fixing layer 14 remain in the first area 13A1 without spreading over the second area 13A2 beyond the third area 13A3. In FIG. 7, a large portion of the first area 13A1 enclosed by a curve is a drop from the first fixing layer 14.

As described above, the liquid crystal display device 10 (the display device) according to this embodiment includes the liquid crystal display module 11 (the display module), the cover glass 13 (the light transmissive panel), the first fixing layer 14, the case 12, the second fixing layer 15, the first area 13A1, the second area 13A2, and the third area 13A3. The liquid crystal display module 11 includes the display surface 11DS for displaying images. The cover glass 13 includes the fixing plate surface 13A opposed to the display surface 11DS. The cover glass 13 passes light therethrough. The first fixing layer 14 is between the fixing plate surface 13A and the display surface 11DS. The case 12 includes the fixing-plate-surface opposed surface 12B1 opposed to the fixing plate surface 13A. The case 12 holds the liquid crystal display module 11. The second fixing layer 15 is disposed between the fixing plate surface 13A and the fixing-plate-surface opposed surface 12B1. The fixing plate surface includes the first area 13A1, the second area 13A2, and the third area 13A3. The first area 13A1 overlaps the first fixing layer 14. The second area 13A2 overlaps the second fixing layer 15. The third area 13A3 is located between the first area 13A1 and the second area 13A2. The third area 13A3 has the wettability less than the wettability of the first area 13A1 and the second area 13A2.

According to the configuration, a user views images displayed on the display surface 11DS of the liquid crystal display module 11 through the cover glass 13 that passes light therethrough. The liquid crystal display module 11 is fixed to the cover glass 13 with the first fixing layer 14 disposed between the fixing plate surface 13A and the display surface 11DS. The case 12 is fixed to the cover glass 13 with the second fixing layer 15 disposed between the fixing plate surface 13A and the fixing-plate-surface opposed surface 12B1. The liquid crystal display module 11 is held in the case 12. The first area 13A1 that overlaps the first fixing layer 14 and the second area 13A2 that overlaps the second fixing layer 15 have the wettability greater than the wettability of the third area 13A3. Therefore, the proper fixing performance of the first fixing layer 14 and the second fixing layer 15 relative to the fixing plate surface 13A of the cover glass 13 is achieved. The third area 13A3 having the wettability less than the wettability of the first area 13A1 and the second area 13A2 is provided between the first area 13A1 and the second area 13A2. The ingredients in the first fixing layer 14 overlapping the first area 13A1 are less likely to spread over the second area 13A2 beyond the third area 13A3 or the ingredients in the second fixing layer 15 overlapping the second area 13A2 are less likely to spread over the first area 13A1 beyond the third area 13A3. Therefore, the wettability of the first area 13A1 and the second area 13A2 is less likely to be degraded. Even if the liquid crystal display module 11 and the case 12 are fixed to the cover glass 13 at different timing, the ingredients in the first fixing layer 14 or the second fixing layer 15 for fixing the liquid crystal display module 11 or the case 12 are less likely to spread beyond the third area 13A3. Therefore, the wettability of the first fixing layer 14 or the second fixing layer 15 for fixing the liquid crystal display module 11 or the case 12 whichever fixed later relative to the fixing plate surface 13A is properly maintained. Therefore, improper attachment or a decrease in airtightness of the liquid crystal display module 11 or the case 12 whichever fixed later is less likely to occur.

To remove the liquid crystal display module 11 or the case 12 from the cover glass 13, the fixing performance of the first fixing layer 14 or the second fixing layer 15 is reduced using a remover. If the remover is applied to the second fixing layer 15 to remove the case 12 first, the remover is less likely to spread over the first area 13A1 beyond the third area 13A3 and the remover may remain in the second area 13A2. According to the configuration, the fixing performance of the second fixing layer 15 may be reduced in a short period. Therefore, the liquid crystal display module 11 or the case 12 can be easily removed from the cover glass 13.

The liquid crystal display module 11 includes the display surface 11DS that includes the display area AA in which images are displayed and the non-display area NAA that surrounds the display area AA. The cover glass 13 is disposed not to overlap the display area AA. The cover glass 13 includes the fixing plate surface 13A that includes the surface of the light blocking portion 16 that blocks light. The surface of the light blocking portion 16 includes the first area 13A1 and the second area 13A2. According to the configuration, the images displayed in the display area AA of the display surface 11DS of the liquid crystal display module 11 are viewed by the user through the area of the cover glass 13 in which the light blocking portion 16 is not provided. The light blocking portion 16 is disposed not to overlap the display area AA and includes the first area 13A1 and the second area 13A2 of the fixing plate surface 13A. Therefore, the non-display area NAA of the liquid crystal display module 11 and the case 12 are less likely to be recognized by the user.

The surface of the light blocking portion 16 includes the first area 13A1 and the second area 13A2 but not include the third area 13A3. The light blocking layer 17 is disposed on the light blocking portion 16 on the liquid crystal display module 11 side. The surface of the light blocking layer 17 defines the third area 13A3. Because the light blocking layer 17 including the surface that defines the third area 13A3 is provided differently from the first area 13A1 and the second area 13A2 includes in the surface of the light blocking portion 16, the third area 13A3 can be easily configured to have the wettability different from the wettability of the first area 13A1 and the second area 13A2 by selecting the material of the light blocking layer 17 where appropriate.

The third area 13A3 has the frame shape to surround the entire perimeter of the first area 13A1. According to the configuration, the ingredients in the first fixing layer 14 overlapping the first area 13A1 are less likely to spread over the second area 13A2 beyond the third area 13A3 or the ingredients in the second fixing layer 15 that overlaps the second area 13A2 are less likely to spread over the first area 13A1 beyond the third area 13A3. Therefore, the wettability of the first area 13A1 and the second area 13A2 are further less likely to be degraded.

The surface tension of the third area 13A3 is less than the surface tensions of the first area 13A1 and the second area 13A2. In general, the greater the surface tension of a surface of an object is, the greater the wettability of the object. The less the surface tension of the object is, the less the wettability of the object is. Because the surface tension of the third area 13A3 is less than the surface tensions of the first area 13A1 and the second area 13A2, the wettability of the third area 13A3 is less than the wettability of the first area 13A1 and the second area 13A2.

The surface tensions of the first area 13A1 and the second area 13A2 may be equal to or greater than 36 mN/m. The surface tension of the third area 13A3 is equal to or less than 34 mN/m. According to the configuration, a sufficient difference in wettability can be achieved between the third area 13A3 and the first area 13A1 or the second area 13A2.

Second Embodiment

The second embodiment will be described with reference to FIG. 8. The second embodiment includes a third area 113A3 that has a configuration different from the third area 13A3 in the first embodiment. Configurations, functions, and effects similar to those of the first embodiment will not be described in detail.

Figure 8:
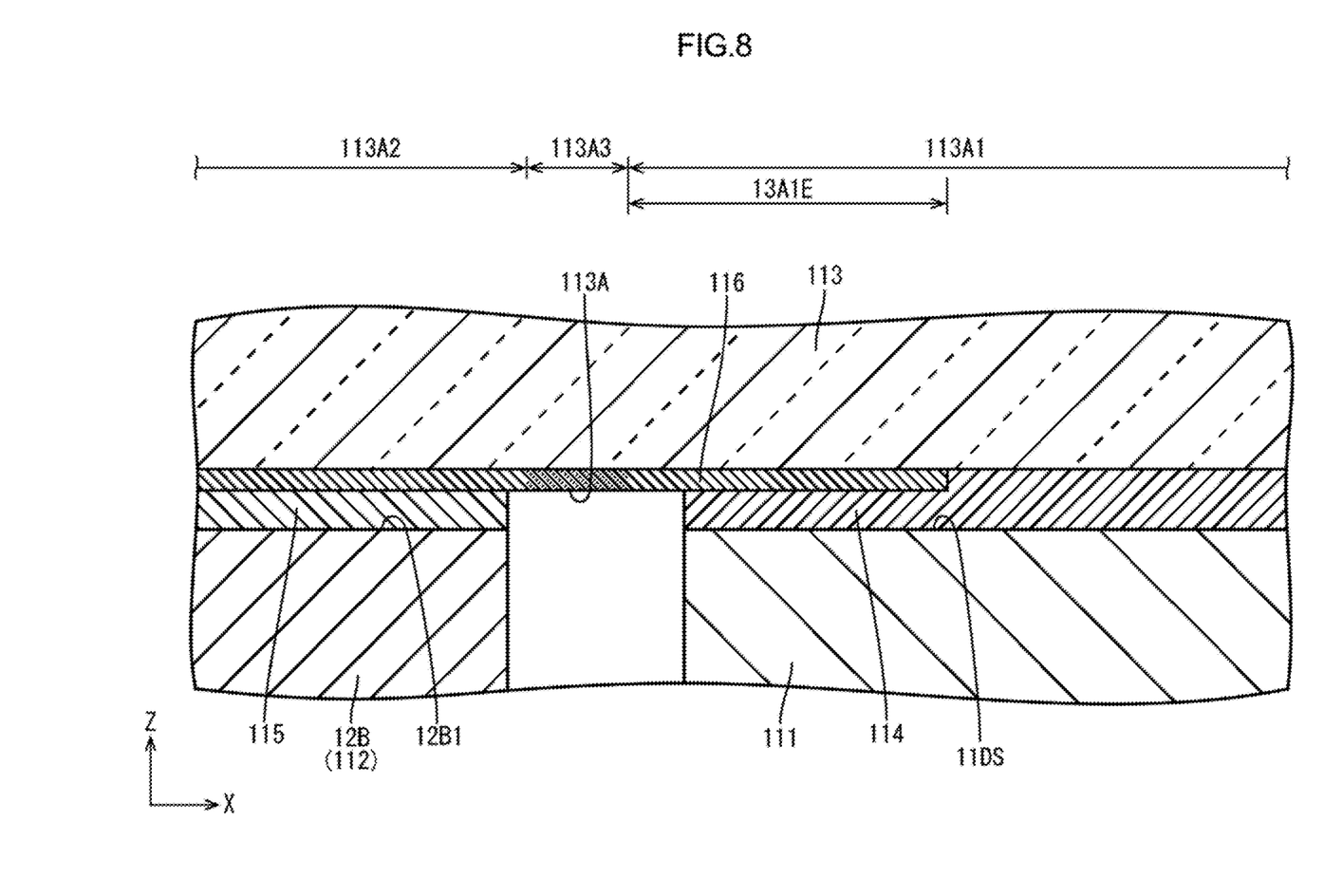
FIG. 8 is a cross sectional view of a liquid crystal display device illustrating a first area to a third area of a fixing plate surface of a cover glass according to a second embodiment.

As illustrated in FIG. 8, a cover glass 113 includes a fixing plate surface 113A. The fixing plate surface 113A does not include the light blocking layer 17 in the first embodiment (see FIG. 3). The fixing plate surface 113A includes a first area 113A1, a second area 113A2, and the third area 113A3.

The third area 113A3 has surface roughness different from surface roughness of the first area 113A1 and the second area 113A2. In FIG. 8, the third area 113A3 is shaded. The fixing plate surface 113A has a hydrophilic surface (or a lyophilic surface). In this embodiment, a surface to which a contact angle of a liquid drop is less than 90° is defined as a hydrophilic surface and a surface to which a contact angle of a liquid drop is greater than 90° is defined as a hydrophobic surface (a lyophobic surface). Because the fixing plate surface 113A is the hydrophilic surface, proper fixing performance of a first fixing layer 114 and a second fixing layer 115 relative to the first area 113A1 and the second area 113A2 can be achieved. Therefore, reliability in fixation of a liquid crystal display module 111 and a case 112 to the cover glass 113 further improves.

The third area 113A3 in the fixing plate surface 113A that is the hydrophilic surface has the surface roughness less than the surface roughness of the first area 113A1 and the second area 113A2. Namely, the third area 113A3 is smoother than the first area 113A1 and the second area 113A2. The fixing plate surface 113A is substantially flat as a whole; however, includes recesses that are recessed from a reference plane. In the first area 113A1 and the second area 113A2, arithmetic mean surface roughness Ra is equal to or greater than 2 μm and the maximum external dimension of the recesses is equal to or greater than 5 μm. In the third area 113A3, the arithmetic mean surface roughness Ra is less than 2 μm and the maximum external dimension of the recesses is less than 5 μm. In general, according to the Wenzel equation, surface wettability of a hydrophilic surface of an object increases as surface roughness of the hydrophilic surface increases and the surface wettability decreases as the surface roughness decreases. By setting the surface roughness of the third area 113A3 less than the surface roughness of the first area 113A1 and the second area 113A2, the wettability of the third area 113A3 is less than the wettability of the first area 113A1 and the second area 113A2. The fixing plate surface 113A having the uneven surface roughness can be prepared by planarizing the third area 113A3 and by roughening the first area 113A1 and the second area 113A2 (e.g., application of ultraviolet rays after a light blocking portion (or film) is formed. Alternatively, the fixing plate surface 113A having the uneven surface roughness may be prepared by planarizing and roughening the entire fixing plate surface 113A. In this case, processing time for the third area 113A3 may be different from processing time for the first area 113A1 and the second area 113A2 so that the fixing plate surface 113A has the surface roughness. Different methods may be applied for preparing the fixing plate surface 113A having the uneven surface roughness.

As described above, in this embodiment, the fixing plate surface 113A is the hydrophilic surface and the third area 113A3 has the surface roughness less than the surface roughness of the first area 113A1 and the second area 113A2. Because the fixing plate surface 113A is the hydrophilic surface, the proper fixing performance of the first fixing layer 114 and the second fixing layer 115 relative to the first area 113A1 and the second area 113A2 can be achieved. Therefore, the reliability in fixation of the liquid crystal display module 111 and the case 112 further improves. In general, surface wettability of a hydrophilic surface of an object increases as surface roughness of the hydrophilic surface increases and the surface wettability decreases as the surface roughness decreases. By setting the surface roughness of the third area 113A3 less than the surface roughness of the first area 113A1 and the second area 113A2, the wettability of the third area 113A3 is less than the wettability of the first area 113A1 and the second area 113A2.

The fixing plate surface 113A includes the recesses that are recessed from the reference plane. In the first area 113A1 and the second area 113A2, the arithmetic mean surface roughness Ra is equal to or greater than 2 μm and the maximum external dimension of the recesses is equal to or greater than 5 μm. In the third area 113A3, the arithmetic mean surface roughness Ra is less than 2 μm and the maximum external dimension of the recesses is less than 5 μm. According to the configuration, the third area 113A3 has the wettability that is sufficiently different from the wettability of the first area 113A1 and the second area 113A2.

Other Embodiments

The technology described herein is not limited to the embodiments described above and with reference to the drawings. The following embodiments may be included in the technical scope.

(1) The wettability of the first area and the wettability of the second area may be defined differently from each other. Values of the surface tension and the surface roughness may be different between the first area and the second area. In this case, the wettability of the first area and the wettability of the second area are defined greater than the wettability of the third area.

(2) The limits of the surface tension of the first to the third area may be altered where appropriate.

(3) The limits of the arithmetic mean roughness Ra and the maximum external dimension of the recesses of the first to the third areas may be altered where appropriate.

(4) The first embodiment and the second embodiment may be combined. For example, the surface tensions and the surface roughness of the first area and the second area may be defined greater and the surface tension and the surface roughness of the third area may be defined less.

(5) The second fixing layer may include an adhesive made of OCR.

(6) The third area may be formed in a circular shape to partially surround the first area in the circumferential direction.

(7) The technology described herein may be applied to display modules including liquid crystal panels other than the liquid crystal panels. If organic EL display modules including organic EL panels are used, the backlight units are not required.

(8) The technology described herein may be applied to a touch panel including a cover glass that includes a touch panel pattern.

(9) A protective panel made of synthetic resin may be used for the light transmissive panel.

(10) The technology described herein may be applied to liquid crystal display devices having horizontally-long rectangular shapes, square shapes, oval shapes, elliptical shapes, circular shapes, trapezoidal shapes, and shapes with curve sections, respectively.

(11) The screen sizes of the liquid crystal panels (display panels) and the applications of the liquid crystal display devices (display devices) may be altered where appropriate.

The invention claimed is:

1. A display device comprising:
a display module including a display surface for displaying images;
a light transmissive panel including a fixing plate surface opposed to the display surface and being configured to pass light therethrough;
a first fixing layer disposed between the fixing plate surface and the display surface;
a case including a fixing-plate-surface opposed surface opposed to the fixing plate surface and holding the display module;
a second fixing layer disposed between the fixing plate surface and the fixing-plate-surface opposed surface;
a first area included in the fixing plate surface and overlapping the first fixing layer;
a second area included in the fixing plate surface and overlapping the second fixing layer; and
a third area included in the fixing plate surface, located between the first area and the second area, and having wettability less than wettability of the first area and the second area.

2. The display device according to claim 1, wherein
the display surface of the display module includes a display area in which the images are displayed and a non-display area surrounding the display area,
the light transmissive panel includes a light blocking portion for blocking light, and
the light blocking portion is disposed not to overlap the display area and includes at least the first area and the second area.

3. The display device according to claim 2, wherein
the light blocking portion includes the first area and the second area but not the third area of the fixing plate surface, and
the light transmissive panel includes a light blocking layer included in the third area and disposed on the light blocking portion on a display module side.

4. The display device according to claim 3, wherein the third area has a frame shape to surround an entire perimeter of the first area.

5. The display device according to claim 1, wherein the third area has a surface tension less than a surface tension of the first area and the second area.

6. The display device according to claim 5, wherein
the surface tension of the first area and the second area is equal to or greater than 36 mN/m, and
the surface tension of the third area is equal to or less than 34 mN/m.

7. The display device according to claim 1, wherein
the fixing plate surface is a hydrophilic surface, and
the third area has surface roughness less than surface roughness of the first area and the second area.

8. The display device according to claim 7, wherein
the fixing plate surface includes recesses that are recessed from a reference plane,
the first area and the second area have arithmetic mean roughness Ra equal to or greater than 2 μm,
the recesses in the first area and the second area have maximum external dimensions equal to or greater than 5 μm,
the third area has arithmetic mean roughness Ra less than 2 μm, and
the recesses in the third area have a maximum external dimension less than 5 μm.

* * * * *